Oct. 21, 1924.

J. B. FLICK 1,512,840

COMBINED GUIDE AND PROTECTOR FOR USE IN UNIVERSAL JOINTS

Original Filed Nov. 9, 1921

Inventor
John B. Flick
By Alexander & Powell
Attorneys.

Patented Oct. 21, 1924.

1,512,840

UNITED STATES PATENT OFFICE.

JOHN B. FLICK, OF DETROIT, MICHIGAN.

COMBINED GUIDE AND PROTECTOR FOR USE IN UNIVERSAL JOINTS.

Original application filed November 9, 1921, Serial No. 513,957. Divided and this application filed September 9, 1922. Serial No. 587,153.

*To all whom it may concern:*

Be it known that I, JOHN B. FLICK, a citizen of the United States, residing at Detroit, in the county of Wayne, State of Michigan, have invented certain new and useful Improvements in Combined Guides and Protectors for Use in Universal Joints; and I hereby declare that the following is a full, clear, and exact description thereof, reference being had to the accompanying drawings, which form part of this specification.

The present application is a division of my application for U. S. Letters Patent on universal joints, filed November 9, 1921, Serial No. 513,957.

This invention relates to universal joint couplings for use in transmitting power from a driving to a driven shaft, and has particular reference to that type of universal joint wherein the driven shaft is provided on its end with a globular head and a transverse pin carrying rollers or balls which engage diametrically opposite slots in a member fixedly attached to the adjacent end of the driving shaft, thus insuring simultaneous rotatorial movement of the shafts while permitting angular displacement of one shaft relative to the other, and also permitting slight endwise longitudinal play of one shaft relative to the other; such joints being particularly adapted for use in the transmission gear of automobiles.

In this type of joint an expansion spring is ordinarily used to prevent rattling due to relative endwise movement of the shafts, which occur when such joint is used in the transmission gear of an automobile; and the rocking of the shaft tends to displace the spring and cause it to operate inefficiently; and to cut into the end of the shaft with which it engages.

The object of the present invention is to provide a novel guide and protector which will prevent the spring wearing the end of the shaft, keep the spring always in correct operative position, and guide the ball head of the shaft in its longitudinal movement, thereby enabling a heavier spring to be used, lessening the wear on the parts, and enhancing the durability of the spring.

I will describe the invention with reference to the accompanying drawings, and summarize in the claims the novel features of construction and novel combinations of parts for which protection is desired.

Figure 3:
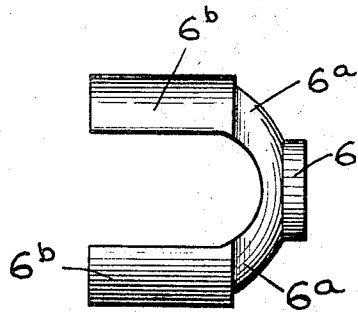
Figure 4:
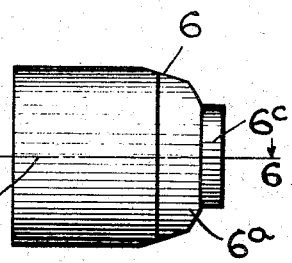
Figure 5:
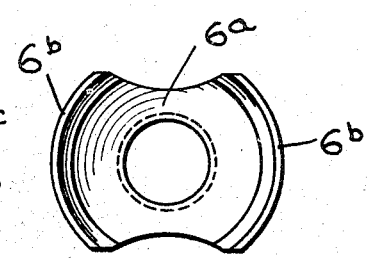

Figs. 3, 4, and 5 are detail, side, top and end views of the guide and protector for the ball end of the shaft.

Figure 6:
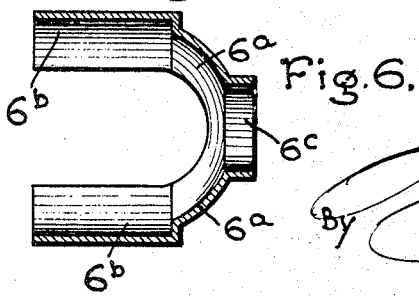

Fig. 6 is a section of the cap guide and protector on line 6—6 Fig. 4.

Figure 1:
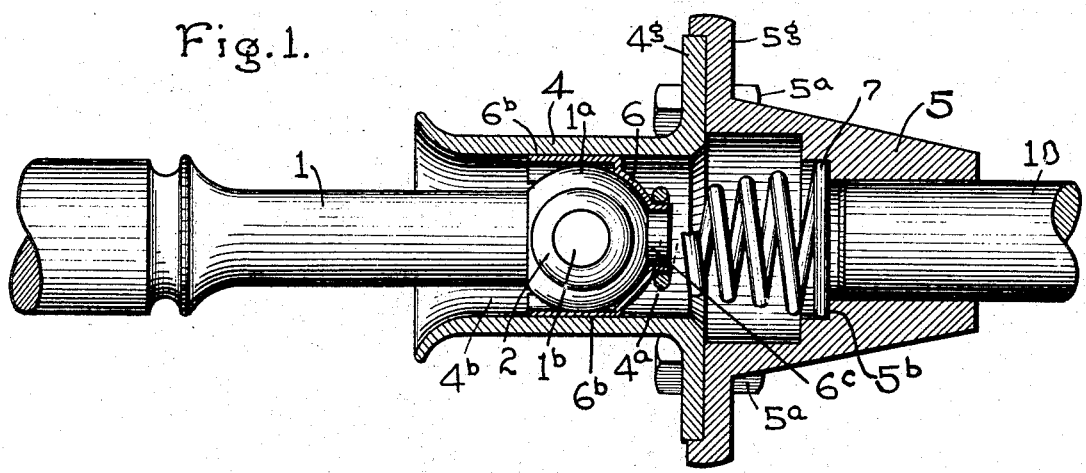
Fig. 1 is a longitudinal sectional view of a universal joint with my novel guide and protector.
Figure 2:
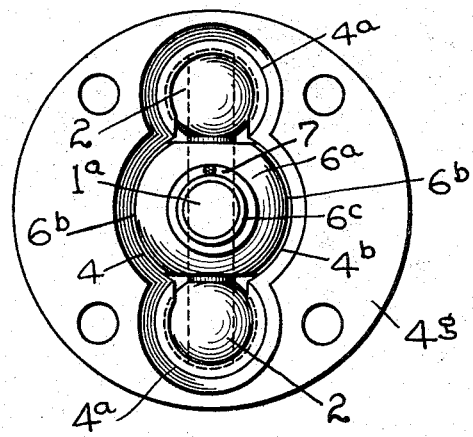
Fig. 2 is an interior view of such joint with the spring and rear part of the housing removed.

The type of joint illustrated in Figs. 1 and 2 comprises a shaft member 1 having a ball-head $1^a$ transfixed by a pin $1^b$ on whose ends at opposite sides of the ball head $1^a$ are mounted rollers or balls 2. The head $1^a$ and balls 2 are entered into one member 4 of a casing preferably composed of two separable members 4 and 5, as shown in the drawings. Part 4 of the casing is provided with an axial bore $4^b$, slightly larger in diameter than the ball-head $1^a$, and at diametrically opposite sides of passage $4^b$, and with slots $4^a$ which open at their inner sides into the outer sides of passage $4^b$, as shown. The head $1^a$ is entered in bore $4^b$ and rollers 2 enter the slots $4^a$ as shown.

The part 4 is open at its outer end, through which the shaft 1 enters, and its inner end is provided with a flange $4^g$ which is attached to a corresponding flange $5^g$ on the end of a complemental casing member 5 formed on or keyed to a shaft 10.

The part 5 is provided with a recess $5^b$ adjacent the inner end of the shaft 10 for the accommodation of an expansion spring 7, which is placed in the casing between the inner end of the shaft 10 and the ball-head $1^a$ of the shaft 1. The inner end of the spring 7 usually presses directly against the ball-head, and to prevent the spring cutting the ball head $1^a$, the latter is rocked, and to guide the ball head, protect the ball head and spring from wear, and to enable a lighter spring to be employed, I provide the novel ball head protector and guide and spring centering device 6, shown detached in Figs. 3-6.

This protector and guide 6 comprises a cup-shaped member preferably formed of pressed or drawn steel, or other suitable metal, and has a parti-spherical end portion 6ª adapted to neatly fit against the inner end of the ball-head 1ª as in Fig. 1, and from the periphery of such cap shaped member extend parallel diametrically opposite leg portions 6ᵇ which are parti-cylindric in cross section and extend on opposite sides of the ball head 1ª and between said ball head and the walls of the axial bore 4ᵇ in casing member 4 (see Figs. 1 and 2). The leg portions 6ᵇ of the protector 6 lie at opposite sides of the ball head 1ª and will prevent the protector rocking longitudinally of or in the groove or bore 4ᵇ while guiding it in the bore and permitting it to freely slide or reciprocate therein. The protector 6 is free to move longitudinally in the casing with the ball head, but will not oscillate or turn with the ball head relative to the axis of pin 1ᵇ, or to the axis of bore 4ᵇ. The ball head 1ª can move freely in all directions within the protector 6 while the protector is capable of longitudinal sliding movements in the bore 4ᵇ and will under the action of spring 7 follow up the ball head in any longitudinal movement thereof in the casing 4.

The protector 6 is preferably provided with an opening in its end 6ª next shaft 10 which opening is surrounded by an exterior flange 6ᶜ with which flange the inner end of spring 7 is engaged, as in Fig. 1. The pressure of the spring 7 is transmitted through protector 6 to the ball head 1ª; and while the ball head can rock within the protector 6ª its rocking motions will not be transmitted to the spring 7 nor can the spring chafe or bind on the head. The protector 6 thus protects the ball head from wear by contact with the spring, and keeps the spring 7 in exact alignment with the axis of bore 4ᵇ at all times, and prevents chattering of the spring and enhances the durability, efficiency and wearing qualities of the joint.

When the parts are assembled the space between the ball head 1ª and the shaft 10 should be packed with grease, so all the parts will be properly lubricated during the operation thereof.

The operation of the parts will be obvious from the drawings and from the foregoing description, and the adaptability of the guide and protector 6 to various forms of ball heads will be obvious.

What I claim is:

1. For a universal joint of the character specified; a combined guide and protector adapted to engage the ball head of the shaft member of the joint and having parallel leg portions extending on opposite sides of the head and engaging the bore of the casing member of the joint, substantially as described.

2. For a universal joint of the character specified; a combined guide and protector adapted to engage the ball head of the shaft member of the joint having portions engaging the bore of the casing member of the joint, and having a flange on its end to engage the spring in the joint, substantially as described.

3. For a universal joint of the character specified; a combined guide and protector adapted to engage the ball head of the shaft member of the joint having parallel portions extending on opposite sides of the ball head and engaging the bore of the casing member of the joint, and having a flange on its end to engage the spring in the joint, substantially as described.

4. For a universal joint of the character specified, a cup-like shell formed of drawn metal and having an end portion adapted to engage the ball head of the shaft member of the coupling and portions adapted to slidably engage the walls of the casing and also having a flange for the engagement of a spring, substantially as described.

5. For a universal joint as set forth, a cup-like shell formed of drawn metal and having an end portion adapted to engage the ball head of the shaft member of the coupling and having parallel leg portions adapted to engage the walls of the bore of the casing at opposite sides of the ball head.

6. For a universal joint of the character specified; a cup-like shell formed of drawn metal having an end portion adapted to engage the ball head of the shaft member of the coupling, and parallel diametrically opposite leg portions adapted to engage the walls of the bore of the casing at opposite sides of the shaft, and also having a flange for the engagement of the spring, substantially as described.

7. In combination with a universal joint comprising a member having diametrically opposite slots, a shaft entering the member having a ball-head and members attached to said head engaging said slots with a combined guide and protector engaging the ball-head of the shaft and having parallel opposite leg portions projecting on opposite sides of the ball-head and engaging the walls of the casing, and a spring in the casing engaging said protector, substantially as described.

8. In combination with a universal joint comprising a member having a bore and slots at diametrically opposite sides of the bore, a shaft entering the member having a ball-head and members attached to said head engaging said slots; with a combined guide and protector fitted to the ball end of the shaft and having parallel opposite leg portions projecting at opposite sides of the ball head and engaging the bore in the casing, and a spring in the casing engaging said protector, substantially as described.

9. In combination with a universal joint comprising a member having a bore, a shaft entering the member having a ball head, with a combined ball guide and protector comprising a cup-shaped member fitted on the end of the ball head and having an opening surrounded by a flange, and portions projecting past opposite sides of the ball head and engaging the bore in the casing; and an expansion spring in the casing engaging said flange, substantially as described.

10. In combination with a universal joint comprising a member having a bore, a shaft entering the member having a ball head with a combined guide and protector for the ball head having parallel portions engaging the walls of the casing at opposite sides of the ball head, and also having an opening in its end surrounded by a flange; and a spring in the casing engaging said flange.

11. A universal joint comprising a casing having an axial bore; a shaft entering the casing and having a ball head on its inner end engaging said bore, with a cup-shaped shell engaging the ball head and having parallel leg portions extending at opposite sides of the head engaging the walls of the bore of the casing, and a spring in the casing to force the shell against the ball head.

12. In combination with a universal joint comprising a member having a bore and having diametrically opposite slots, a shaft entering the member having a ball head, and members attached to said head engaging said slots with a combined ball guide and protector comprising a cup-shaped member fitted on the end of the ball head and having an opening surrounded by a flange and parallel opposite leg portions projecting past opposite sides of the ball head and engaging the bore in the casing; and an expansion spring in the casing engaging said flange, substantially as described.

13. In combination with a universal joint comprising a member having a bore and diametrically opposite slots, a shaft entering the member having a ball head and members connected to said head engaging said slots; with a combined guide and protector on the ball head having parallel portions engaging the walls of the casing at opposite sides of the ball head, and parallel opposite leg portions projecting past opposite sides of the ball head and engaging the bore in the casing, and also having an opening in its end surrounded by a flange; and a spring in the casing engaging said flange.

14. In combination with a universal joint comprising a casing having an axial bore and diametrically opposite slots opening into the bore; a shaft entering the member and having a ball head on its inner end engaging said bore and members mounted on the ball head and respectively entered in said slots; with a cup-shaped shell engaging the ball head and having parallel leg portions extending at opposite sides of the head and engaging the walls of the bore of the casing, and a spring in the casing engaging said shell to force it against the head.

15. A universal joint comprising a casing having an axial bore and diametrically opposite slots opening into the bore; a shaft entering the member and having a ball head on its inner end engaging said bore and members mounted on the ball head and respectively entered in said slots, with a drawn metal cup-shaped member fitted to the inner end of the ball head and having parallel leg portions at opposite sides of the ball head engaging the walls of the bore of the casing at opposite sides of the head, and also having an opening in its inner end surrounded by a flange; and a spring in the casing engaging said flange to force the shell against the head.

In testimony that I claim the foregoing as my own, I affix my signature.

JOHN B. FLICK.